(12) United States Patent
Lind

(10) Patent No.: US 6,857,440 B2
(45) Date of Patent: Feb. 22, 2005

(54) SAFETY VALVE

(75) Inventor: Björn Lind, Billdal (SE)

(73) Assignee: Lind Finance & Development AB, Göteborg (SE)

( * ) Notice: Subject to any disclaimer, the term of this patent is extended or adjusted under 35 U.S.C. 154(b) by 0 days.

(21) Appl. No.: 10/479,816

(22) PCT Filed: Jun. 18, 2002

(86) PCT No.: PCT/SE02/01174
§ 371 (c)(1),
(2), (4) Date: Jan. 7, 2004

(87) PCT Pub. No.: WO02/103232
PCT Pub. Date: Dec. 27, 2002

(65) Prior Publication Data
US 2004/0112430 A1 Jun. 17, 2004

(30) Foreign Application Priority Data
Jun. 19, 2001 (SE) .............................................. 0102165

(51) Int. Cl.[7] .......................... F16K 17/34; F16K 17/24; G05D 7/01
(52) U.S. Cl. ...................... 137/2; 137/112; 137/118.03; 137/498; 251/50
(58) Field of Search ................................. 137/111, 112, 137/113, 114, 118.01, 118.02, 118.03, 118.04, 118.06, 119.03, 460, 498

(56) References Cited
U.S. PATENT DOCUMENTS

| | | | | | |
|---|---|---|---|---|---|
| 3,543,783 | A | * | 12/1970 | Ifield | 137/101 |
| 3,753,601 | A | * | 8/1973 | Hensley | 303/84.2 |
| 3,845,777 | A | * | 11/1974 | Gilson | 137/119.03 |
| 4,265,269 | A | * | 5/1981 | Dolberg et al. | 137/118.03 |
| 5,215,113 | A | | 6/1993 | Terry | |

FOREIGN PATENT DOCUMENTS

EP 0018169 10/1980

* cited by examiner

Primary Examiner—Ramesh Krisnamurthy
(74) Attorney, Agent, or Firm—Ware, Fressola, Van der Sluys & Adolphson LLP

(57) ABSTRACT

In a method for a safety valve plus such a safety valve, the safety valve has the form of a valve body axially displaceable in a cavity with an inlet on either side of which are arranged outlets, whereby liquid and/or gas flow takes place from the inlet and past the valve body via a flow path to the outlets. On the valve body side, the flow path is provided with a structure that raises the friction in relation to the liquid and/or gas flow between the inlet and outlets.

32 Claims, 2 Drawing Sheets

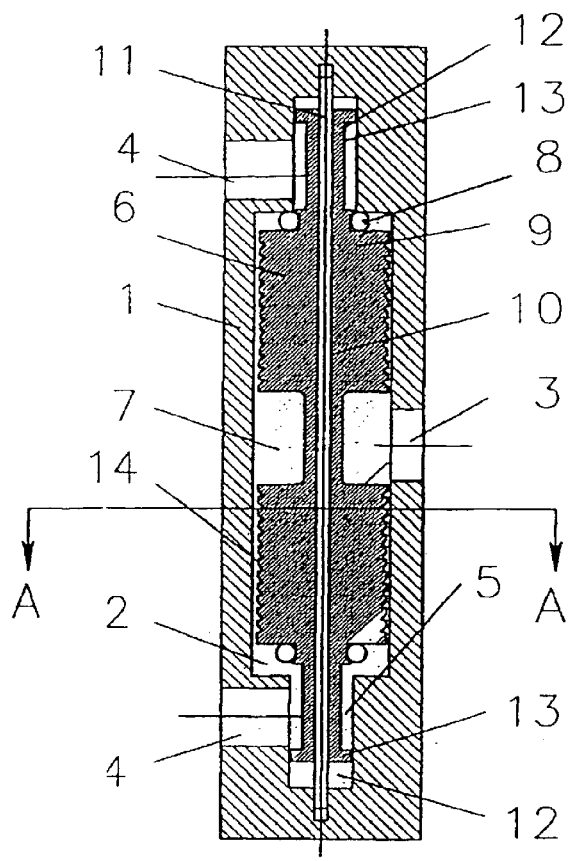
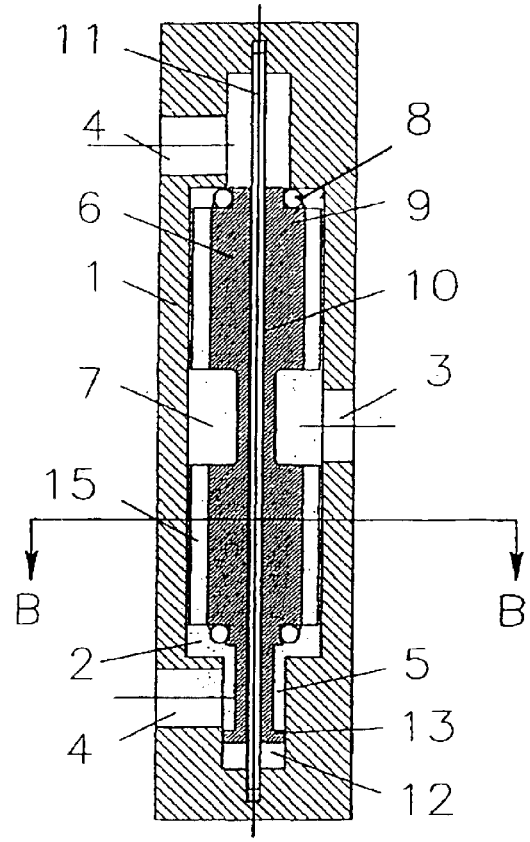
Fig 1
Fig 2
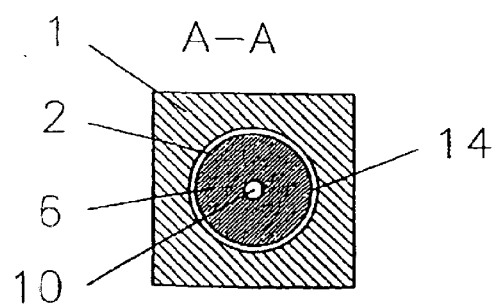
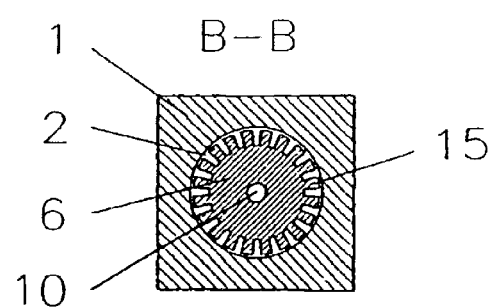
Fig 4
Fig 5

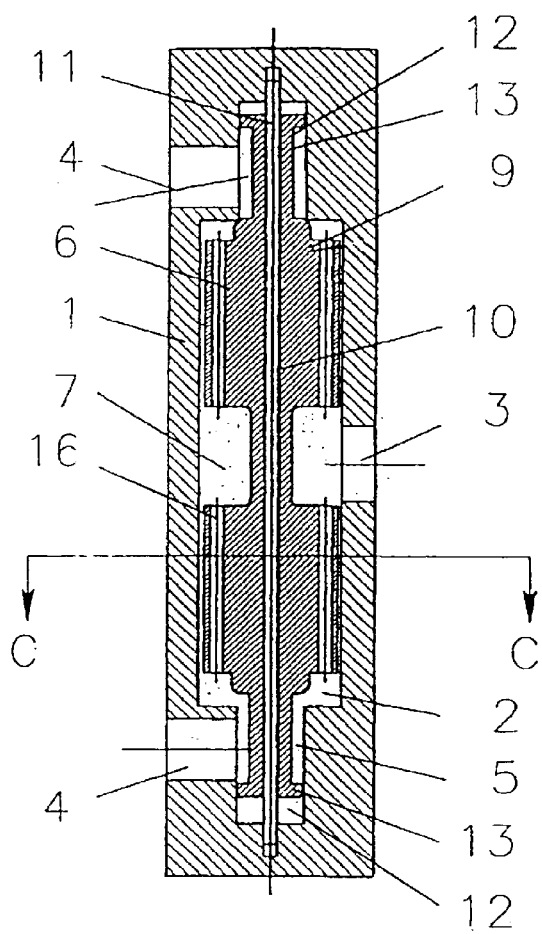
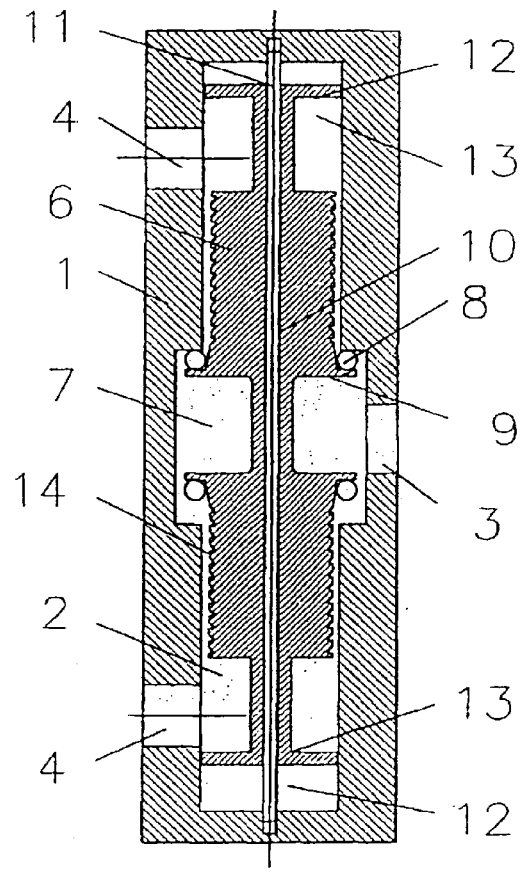
Fig 3   Fig 7
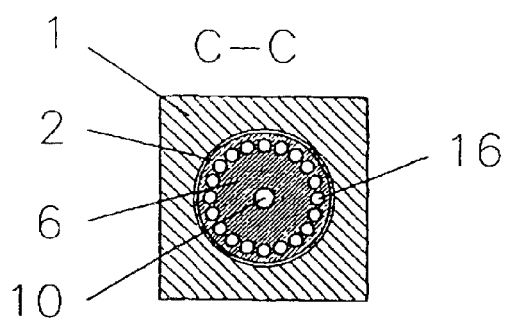
Fig 6

SAFETY VALVE

BACKGROUND OF THE INVENTION

1. Technical Field

The present invention relates to a method for a safety valve and a safety valve in the form of a valve body displaceable in a cavity with an inlet on either side of which are arranged outlets, whereby liquid and/or gas flow takes place from the inlet via a flow path passing through the valve body to the outlets. Alternatively, there can be two inlets and an outlet arranged between them, whereby liquid and/or gas flow takes place from the inlets via a flow path passing through the valve body to the outlet.

2. Description of the Background Art

Safety valves of this type exhibit a cavity with a cylindrical shape in which a plunger moves axially. The valve is provided with an inlet to the cavity as well as an outlet from the cavity arranged on either side of the inlet. Depending on the position of the plunger in the cavity, the plunger seals one or the other of the outlets, or allows both to be open. A safety valve of this type thus permits flow through two separate pipes connected to the outlets over the distance where the risk of a break in the pipe is considered to merit extra security. When a break in a pipe occurs in one of the separate pipes, the pressurized medium, liquid and/or gas, is nevertheless continuously maintained via the second pipe in all significant respects with regard to flow and pressure. As the pressure at the outlet to the damaged pipe falls in relation to the pressure prevailing at the outlet to the second pipe, the plunger will be displaced towards the outlet with the lower pressure and seal this outlet.

The disadvantage of these tube-breakage valves, is however, that their function is based on the difference in pressure that is expected to arise when the pipe breakage occurs, but not on the forces of mass seen as a result of the increased flow that act on the valve body in a direction against the "remaining pipe". These forces of mass can bring about that the effect of the pressure difference that has arisen ceases and the valve does not attain that position in which it stops the unwanted leakage flow. The valve body does not react to small flows but rather requires that the break in the pipe brings about a significant leakage flow in order for the valve body to close. Another problem with this type of valve is that when the valve is brought into action and one pipe is blocked, (which can often happen spontaneously at start-up), the valve will, depending on the difference in pressure created, remain in position. If, in this case, the active pipe is damaged, it is highly likely that the leakage in this pipe will not be prevented, which means that the desired safely function is not achieved. In addition, there is no dampening function, which can initiate self-oscillation of the valve body.

SUMMARY OF THE INVENTION

Through the present invention, the disadvantages named above are avoided and a fully-functioning safety valve is achieved.

A safety valve of the present invention includes:
(a) a housing defining a cavity with an inlet on either side of which are arranged outlets;
(b) a valve body displaceable in the cavity whereby a fluid flow can take place from the inlet via a flow path passing through the housing by the valve body to the outlets; and (c) a surface with a structure in relation to the flow path adjacent the valve body for increasing friction so that friction force of the fluid flow acting on the valve body initially is greater than a force due to a pressure drop over the inlet and one of the outlets during a break in a pipe connected to the one of the outlets.

Ideally, the surface exists between an inside of the cavity and an outside of the valve body. The structure can, alternatively, be provided by (1) furrows on the valve body; (2) longitudinal furrows on the valve body; or (3) at least one channel running through the valve body.

Conveniently, a separately arranged restricted channel extends between the outlets. The channel runs through the valve body.

In another aspect of the invention, at least one end of the cavity has a constricted section which defines a dampening chamber together with an end of the valve body.

Alternatively, the safety valve can be used with a reversed direction of flow so that the outlets act as inlets and the inlet acts as an outlet. In this case, the function regarding the invention is in principle the same. At a break in a pipe connected to one of the two inlets, the fall in pressure will take place over the two inlets and the flow will be towards the inlet connected to the broken pipe, with the same effect on the valve body as described previously.

The invention will be described more closely in the form of examples with reference to the drawing.

BRIEF DESCRIPTION OF THE DRAWING

In FIGS. 1, 2 and 3, the drawings show schematically in longitudinal section examples of three embodiments of safety valves according to the invention, and FIGS. 4, 5 and 6 shows chematically cross-sections of the embodiments according to FIGS. 1, 2 and 3.

FIG. 7 shows schematically a further embodiment of the invention.

DETAILED DESCRIPTION OF THE INVENTION

In the figures, 1 designates a valve housing provided with a cavity 2 of cylindrical shape and, in relation to the cavity 2, a central inlet 3 on either side of which are arranged outlets 4 that connect to constricted cylindrical sections 5 of the cavity 2 (not for the embodiment according to FIG. 7). An axially displaceable valve body 6 in the form of a plunger is arranged inside valve housing 1. The plunger 6 is undercut at 7 level with the inlet 3 for introducing the pressurized medium in the form of a fluid such as liquid and/or gas into the cavity 2. In addition, plunger 6 is provided with a sealing surface at each end of the plunger 6, an O-ring 8, for example, that interacts with the respective seats 9 of the plunger 6 and shoulders of valve housing 1 formed adjacent the constricted cylindrical sections 5. A column in the form of a channel 10 extends through the plunger. This channel 10 comprises a borehole in which a rod or axle 11 is arranged in order to achieve a suitable restriction (this axle 11 is not drawn in FIGS. 4, 5 and 6). The axial connection between the ends of the plunger 6 in the form of channel 10 allows the possibility of flow between the end surfaces of the plunger 6 with the intention of evening out possible differences in pressure between them, which can often arise during start-up even without any leakage occurring in any of the two outlet pipes.

For the embodiments according to FIGS. 1, 3 and 7, a dampening arrangement is arranged in each end of the valve housing 1 in the form of a dampening chamber 12 that, with the aid of a secondary plunger 13 that is permanently connected with the valve body 6, forms a space to accommodate fluid that varies with the axial movement of the valve body 6 and that has a restricted inlet and/or outlet in the form of a cleft: (not shown) formed by one or more scores in the secondary plunger 13 or from the play between the secondary plunger 13 and the section 5 of the cylindrical cavity 2 that surrounds it. The embodiment shown in FIG. 2 is provided with only one dampening chamber 12 (in the lower part of the safety valve according to the figure). The dampening arrangement is to prevent instability and axial oscillation self-generated by the axial flowing forces.

From the inlet 3, the pressurized medium can flow between the inside of the valve housing 1 and the outside of the plunger 6 to both outlets 4. In FIGS. 1, 2 and 7, this constitutes the primary flow path for the pressurized medium. In accordance with the invention, this achieves an increased force of friction between the fluid and the plunger 6 in that the enveloped surface of the plunger 6 has attained a desired large resistance to flow for the fluid when compared with a smooth, cylindrical enveloped surface. FIGS. 1 and 4 show the enveloped surface of the valve body 6 provided with transverse grooves or furrows 14 (the equivalent also applies to the embodiment shown in FIG. 7). The embodiments according to FIGS. 2 and 5 increase the friction of the flow by having surface structures in the form of longitudinal bar extensions 15 that run along the periphery of the valve body 6. According to the embodiment in FIGS. 3 and 6, the surface structures that increase the friction of the flow are achieved via a number of fully-penetrating bore holes 16 arranged in the valve body 6. These bore holes 16 can in turn be provided on the inside with grooves or furrows or extending bars (not shown). Other types of structures that increase the friction of the flow are naturally possible within the scope of the invention, for example, a smooth surface structure of a valve body considered sufficiently long to fulfill this intended function.

On the first hand, the function of the valve depends on the force of friction of the medium that acts on the valve body 6 and that will always seek to achieve that equal flows exist in each outlet 4 through a larger flow in one direction attempting to restrict the outlet affected. The force of friction from the flow that acts on the valve body 6 will, in the event of a break in the pipe, be such that it dominates over the force of mass that the flow causes and which counteracts the tendency of the valve body 6 to move in a direction to restrict the outlet to the damaged pipe. The increased restriction results in an increased pressure drop occurring over the valve seat 9, creating a pressure difference between the outlets 4 and resulting in the flow to the damaged pipe being stopped as long as this pressure difference prevails. The force generated by this pressure difference is greater than the flow-generated force of friction in the direction of flow. If the leakage ceases, the function will then be that the said pressure difference is eliminated because of the flow that is allowed through the restricted connection—channel 10—between both outlets 4 and the force of friction of the flow will once again become relevant. The invention thus utilizes initially the force of friction acting on the valve plunger 6 to move the valve body towards its closed position, and secondarily the prevailing under-pressure in the outlet. The plunger 6 remains in this closed position because of the under-pressure in the damaged pipe and thus at the outlet 4 to which the pipe is connected, and because the over-pressure in the outlet 4 to the non-damaged pipe creates a force that exceeds the force of friction that the double flow produces in the opposite direction, i.e. towards the second outlet. It is therefore important to ensure that the speed of flow and therefore the force of that that occurs on the plunger 6 does not exceed the force from the sum of the over-pressure respectively under-pressure at the end surfaces of the plunger 6. To handle the high forces of friction from the flow, the force on the surface of the plunger 6 and the system pressure must dominate. To amplify the action of the fluid on the valve body 6, it can be advantageous if the inside of the valve housing 1, i.e. the wall of the cavity 2, is manufactured with a surface structure that facilitates high rates of flow.

The embodiment according to FIG. 7 differs in principle from the previously described embodiments in that the sealing surface (O-rings 8) are located in the center section of the valve body and interact with the valve seat 9 located in the undercut part 7 of the plunger 6.

Compared with other known safety valves, the valve according to the invention exhibits a low resistance to flow in that it initially works with flow while the known valves work with pressure drop.

It should be realized that the valve according to the invention can be used with a reversed direction of flow so that the described outlets 4 act as inlets and the previously described inlet 3 acts as an outlet. In this case, the function regarding the invention is in principle the same. At a break in a pipe connected to one of the two inlets 4, the fall in pressure will take place over the two inlets and the flow will be towards the inlet connected to the broken pipe, with the same effect on the valve body as described previously.

What is claimed is:

1. A method for a safety valve comprising the steps of:
   (a) providing a housing defining a cavity with an inlet on either side of which are arranged outlets;
   (b) providing a valve body displaceable in the cavity;
   (c) providing a surface with such a structure in relation a fluid flow through the housing that the valve body is forced by friction force from the fluid flow acting thereon primarily to be displaced towards one of the outlets before a force due to a pressure drop over the inlet and the one outlet is secondarily brought to seal the one outlet during a break in a pipe connected thereto; and
   (d) providing the fluid flow from the inlet via a flow path passing through the housing to the outlets.

2. The method for a safety valve according to claim 1, wherein the surface exists between an inside of the cavity and an outside of the valve body.

3. The method for a safety valve according to claim 1, wherein the structure is provided by furrows on the valve body.

4. The method for a safety valve according to claim 1, wherein the structure is provided by longitudinal furrows on the valve body.

5. The method for a safety valve according to claim 1, wherein the structure is provided by at least one channel running through the valve body.

6. The method for a safety valve according to claim 1, wherein a separately arranged restricted channel extends between the outlets.

7. The method for a safety valve according to claim 6, wherein the channel runs through the valve body.

8. The method according to claim 1, wherein at least one end of the cavity has a constricted section which defines a dampening chamber together with an end of the valve body.

9. The method for a safety valve comprising the steps of:
   (a) providing a housing defining a cavity with two inlets and an outlet arranged therebetween;

(b) providing a valve body displaceable in a cavity;

(c) providing a surface with such a structure in relation to a fluid flow through the housing that the valve body is forced by friction force from the fluid flow acting thereon primarily to be displaced towards one of the inlets before a force due to a pressure drop over the inlets is secondarily brought to seal the one inlet during a break in a pipe connected thereto; and (d) providing the fluid flow from the inlets via a flow path passing through the housing to the outlet.

10. The method for a safety valve according to claim 9, wherein the surface exists between an inside of the cavity and an outside of the valve body.

11. The method for a safety valve according to claim 9, wherein the structure is provided by furrows on the valve body.

12. The method for a safety valve according to claim 9, wherein the structure is provided by longitudinal furrows on the valve body.

13. The method for a safety valve according to claim 9, wherein the structure is provided by at least one channel running through the valve body.

14. The method for a safety valve according to claim 9, wherein a separately arranged restricted channel extends between the inlets.

15. The method for a safety valve according to claim 14, wherein the channel runs through the valve body.

16. The method according to claim 9, wherein at least one end of the cavity has a constricted section which defines a dampening chamber together with an end of the valve body.

17. A safety valve comprising:

(a) a housing defining a cavity with an inlet on either side of which are arranged outlets;

(b) a valve body displaceable in the cavity whereby a fluid flow can take place from the inlet via a flow path passing through the housing by the valve body to the outlets; and (c) a surface with a structure in relation to the flow path adjacent the valve body for increasing friction so that friction force of the fluid flow acting on the valve body initially is greater than a force due to a pressure drop over the inlet and one of the outlets during a break in a pipe connected to the one of the outlets.

18. The safety valve according to claim 17, wherein the surface exists between an inside of the cavity and an outside of the valve body.

19. The safety valve according to claim 17, wherein the structure is provided by furrows on the valve body.

20. The safety valve according to claim 17, wherein the structure is provided by longitudinal furrows on the valve body.

21. The safety valve according to claim 17, wherein the structure is provided by at least one channel running through the valve body.

22. The safety valve according to claim 17, wherein a separately arranged restricted channel extends between the outlets.

23. The safety valve according to claim 22, wherein the channel runs through the valve body.

24. The safety valve according to claim 17, wherein at least one end of the cavity has a constricted section which defines a dampening chamber together with an end of the valve body.

25. A safety valve comprising:

(a) a housing defining a cavity with two inlets and an outlet arranged between them;

(b) a valve body displaceable in the cavity whereby a fluid flow takes place from the inlets via a flow path passing through the housing by the valve body to the outlet; and (c) a surface with a structure in relation to the flow path adjacent the valve body for increasing friction so that friction force of the fluid flow acting on the valve body initially is greater than a force due to a pressure drop over the inlets during a break in a pipe connected to one of the inlets.

26. The safety valve according to claim 25, wherein the surface exists between an inside of the cavity and an outside of the valve body.

27. The safety valve according to claim 25, wherein the structure is provided by furrows on the valve body.

28. The safety valve according to claim 25, wherein the structure is provided by longitudinal furrows on the valve body.

29. The safety valve according to claim 25, wherein the structure is provided by at least one channel running through the valve body.

30. The safety valve according to claim 25, wherein a separately arranged restricted channel extends between the inlets.

31. The safety valve according to claim 23, wherein the channel runs through the valve body.

32. The safety valve according to claim 24, wherein at least one end of the cavity has a constricted section which defines a dampening chamber together with an end of the valve body.

* * * * *